US012608289B2

(12) United States Patent
Doddi et al.

(10) Patent No.: US 12,608,289 B2
(45) Date of Patent: Apr. 21, 2026

(54) INTERCONNECT LINK WITH A RESILIENT LINK MODE BASED ON A LINK STATUS REGISTER

(71) Applicant: QUALCOMM Incorporated, San Diego, CA (US)

(72) Inventors: Ravindranath Doddi, Hyderabad (IN); Umamaheshwaran V, Salem (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/786,052

(22) Filed: Jul. 26, 2024

(65) Prior Publication Data

US 2026/0030123 A1　　Jan. 29, 2026

(51) Int. Cl.
G06F 11/20　　　　(2006.01)

(52) U.S. Cl.
CPC .... G06F 11/2002 (2013.01); *G06F 2201/805* (2013.01)

(58) Field of Classification Search
CPC ..................... G06F 11/2002; G06F 2201/805
See application file for complete search history.

(56) References Cited

U.S. PATENT DOCUMENTS

| | | | |
|---|---|---|---|
| 9,762,434 B2 | 9/2017 | Franzon et al. | |
| 10,296,253 B2 | 5/2019 | Adar et al. | |
| 11,789,807 B1 * | 10/2023 | Kochavi | G06F 11/1004 |
| | | | 714/15 |
| 11,797,378 B2 | 10/2023 | Iyer et al. | |
| 2015/0278040 A1 | 10/2015 | Sikkink et al. | |
| 2016/0210255 A1 * | 7/2016 | Wicki | H04L 12/4625 |
| 2016/0363626 A1 * | 12/2016 | How | H01L 25/0652 |
| 2017/0116093 A1 * | 4/2017 | Arroyo | G06F 11/2005 |
| 2022/0222198 A1 * | 7/2022 | Lanka | H01L 23/5383 |
| 2022/0327276 A1 | 10/2022 | Seshan et al. | |
| 2024/0027516 A1 | 1/2024 | Chakravarty et al. | |
| 2025/0068529 A1 * | 2/2025 | Chakravarty | G06F 11/2242 |

OTHER PUBLICATIONS

International Search Report and Written Opinion PCT/US2025/032296 ISA/EPO Sep. 8, 2025.

* cited by examiner

*Primary Examiner* — Michael Maskulinski
*Assistant Examiner* — Xinyuan Yu
(74) *Attorney, Agent, or Firm* — Loza & Loza, LLP

(57)　　　　ABSTRACT

An integrated circuit (IC) device includes a plurality of chiplets including a first device and a second device. A die-to-die (D2D) interconnect link connects between the first device and the second device. A link training and status state machine (LTSSM) of the IC device is configured to operate the degraded D2D interconnect link in a resilient link mode to provide a plurality of enabled lanes and a plurality of disabled lanes. The LTSSM detects a faulty lane among the plurality of enabled lanes, and replaces the faulty lane using a functional lane from the plurality of disabled lanes to maintain the degraded D2D interconnect link.

30 Claims, 12 Drawing Sheets

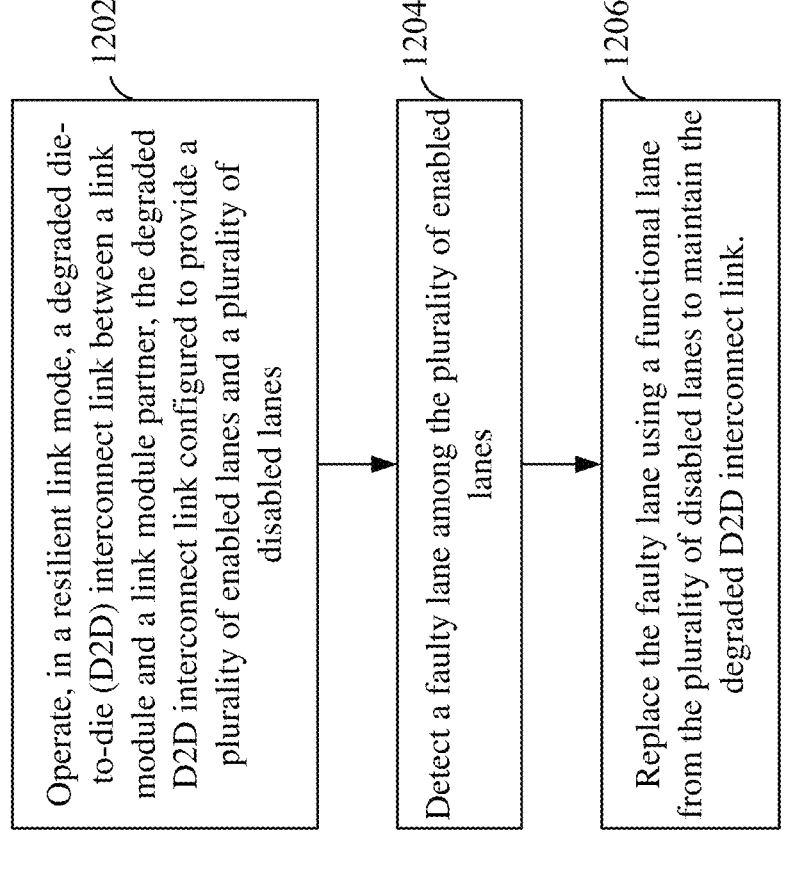

1200

1202

Operate, in a resilient link mode, a degraded die-to-die (D2D) interconnect link between a link module and a link module partner, the degraded D2D interconnect link configured to provide a plurality of enabled lanes and a plurality of disabled lanes

1204

Detect a faulty lane among the plurality of enabled lanes

1206

Replace the faulty lane using a functional lane from the plurality of disabled lanes to maintain the degraded D2D interconnect link.

FIG. 12

INTERCONNECT LINK WITH A RESILIENT LINK MODE BASED ON A LINK STATUS REGISTER

TECHNICAL FIELD

The present disclosure relates generally to integrated circuit technology and more particularly to techniques for operating an interconnect link in a resilient link mode in a semiconductor device.

BACKGROUND

A computer system can include a single or multiple integrated circuits with multiple cores or processors present on one or more individual integrated circuit devices or dies. An integrated circuit device can include one or more dies, which may include various components, for example, processing cores, graphical processors, interfaces, memory, communication circuitry, etc. An integrated circuit device can be implemented using multiple integrated circuit dies that are included in the same package, and on-package interconnects can be used to connect the integrated circuit dies together. In some examples, an integrated circuit die can be referred to as a chiplet. A chiplet is a functional unit that performs certain specific tasks or provides certain functionality within an integrated circuit device containing multiple chiplets or dies.

An example of a die-to-die (D2D) interconnect link is the Universal Chiplet Interconnect Express (UCIe) link. UCIe is an open, multi-protocol capable, on-package interconnect standard for connecting multiple dies (e.g., chiplets) on the same integrated circuit (IC) package. A UCIe link can support multiple protocols (Peripheral Component Interconnect Express (PCIe), Compute Express Link (CXL), etc.) on top of a common physical and link layer. The UCIe link can provide interoperability across a wide range of devices having different performance characteristics and requirement. A UCIe link can provide various link width, for example, 8 lanes (×8) and 16 lanes (×16).

SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

Certain aspects of the disclosure relate to integrated circuit (IC) devices that include multiple chiplets or dies that are connected using a die-to-die (D2D) interconnect link.

One aspect of the disclosure provides a method for managing a faulty lane of a die-to-die interconnect link. The method includes operating a degraded die-to-die (D2D) interconnect link between a first device and a second device, the degraded D2D interconnect link configured to provide a plurality of enabled lanes and a plurality of disabled lanes. The method further includes detecting a faulty lane among the plurality of enabled lanes, and replacing the faulty lane using a functional lane from the plurality of disabled lanes to maintain the degraded D2D interconnect link in a resilient link mode.

One aspect of the disclosure provides an integrated circuit (IC) device including: a plurality of chiplets including a first device and a second device; a die-to-die (D2D) interconnect link connected between the first device and the second device; and a link training and status state machine (LTSSM). The LTSSM is configured to: operate the D2D interconnect link to provide a plurality of enabled lanes and a plurality of disabled lanes; detect a faulty lane among the plurality of enabled lanes; and replace the faulty lane using a functional lane from the plurality of disabled lanes to maintain the D2D interconnect link in a resilient link mode.

One aspect of the disclosure provides a system-on-chip (SoC) including: means for operating a die-to-die (D2D) interconnect link as a degraded link comprising a plurality of enabled lanes and a plurality of disabled lanes, the D2D interconnect link configured to communicate data between a plurality of chiplets of the SoC using a Universal Chiplet Interconnect Express (UCIe) protocol; means for detecting a faulty lane among the plurality of enabled lanes; and means for replacing the faulty lane using a functional lane from the plurality of disabled lanes to maintain the D2D interconnect link in a resilient link mode.

One aspect of the disclosure provides an integrated circuit device including a first die, a second die, and a die-to-die (D2D) interconnect link connected between the first die and the second die. The first die includes a communication interface connected to the D2D interconnect link, and one or more processors connected to the communication interface. The one or more processors is configured to: operate the D2D interconnect link as a degraded link comprising a plurality of enabled lanes and a plurality of disabled lanes; detect a faulty lane among the plurality of enabled lanes; and replace the faulty lane using a functional lane from the plurality of disabled lanes to maintain the D2D interconnect link in a resilient link mode.

BRIEF DESCRIPTION OF THE DRAWINGS

FIG. 12 is a flow chart illustrating a method for operating a D2D interconnect link in a resilient link mode according to some aspects of the disclosure.

DETAILED DESCRIPTION

Figure 1:
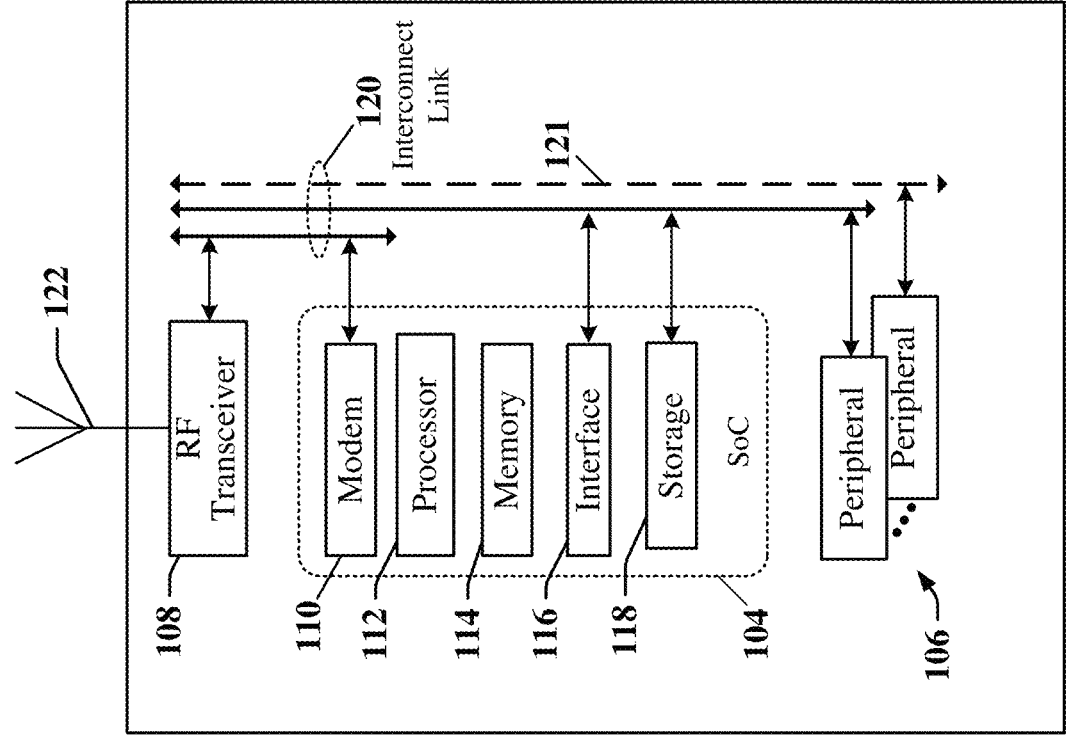
FIG. 1 illustrates an apparatus that can be implemented as an integrated circuit (IC) device including multiple components connected by interconnects according to some aspects of the disclosure.
Figure 1:

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

In the rapidly evolving field of semiconductor technology, the integration of multiple chiplets or dies within a single integrated circuit package represents a significant advancement towards achieving higher performance and scalability. The Universal Chiplet Interconnect Express (UCIe) is a die-to-die (D2D) interconnect link standard that facilitates the interconnectivity between diverse chiplets or dies to form a cohesive and functional integrated circuit (IC) device. The robustness of these interconnections is important, as faults within the UCIe data lanes can severely impact the overall performance and reliability of the IC device. Current implementations of UCIe, while effective in creating extensive networks of chiplets, lack the flexibility to efficiently address and repair lanes that become faulty after the initial configuration. This limitation is particularly evident in scenarios where the UCIe link already operates at the minimal supported link width, leaving no room for further degradation without total link failure.

The present disclosure provides a novel approach to managing and replacing faulty lanes within a UCIe link, enhancing the resilience and reliability of chiplet interconnections. The novel techniques enable the chiplets to adapt to lane failures in real-time, ensuring continuous operation without the need for complete system halts or extensive manual interventions. A UCIe link includes a plurality of physical lanes that operate in a plurality of supported link width, for example, a full link width and one or more reduced link width. The full link width includes all lanes (e.g., 16 lanes (×16)) of the UCIe link. The reduced link width includes a subset of the lanes (e.g., ×8). When one or more lanes are faulty, the UCIe link can operate in a degraded mode with a reduced link width to exclude the faulty lane(s). However, when the faulty lanes are distributed among the physical lanes, the UCIe link may not be able to operate in any supported reduced link width. A faulty lane cannot transmit and/or receive data between the connected UCIe devices.

In some aspects, a UCIe link training state machine can monitor UCIe lane status utilizing a newly designed resilient lane mode and a lane status register. In the newly designed resilient lane mode, a UCIe link can operate at a reduced link width using non-contiguous physical lanes. The non-contiguous physical lanes can be remapped to contiguous logical lanes. In the present disclosure, physical lanes are the actual physical connections or pathways used to transmit data between UCIe devices or entities. Logical lanes refer to the virtual or logical representation of the data pathways within the UCIe protocol. In some aspects, the device can identify functional lanes among disabled lanes of a degraded link and reconfigure the UCIe link using these functional lanes, thus maintaining the integrity and functionality of the UCIe link. The techniques can extend the operational life of the semiconductor package and significantly reduce downtime and maintenance costs associated with lane failures of a degraded link.

FIG. 1 illustrates an example of an apparatus 100 that can be implemented as an integrated circuit (IC) device including multiple components or dies (e.g., chiplets) connected by one or more interconnect links. In some examples, the apparatus can be enclosed within a portable or a wearable device, such as a smartwatch or a mobile device (e.g., smartphone, mobile phone, notebook, tablet, etc.). In some aspects, the apparatus 100 includes various circuitry to different functions. In various examples, the circuitry can be implemented using one or more dies (e.g., chiplets) arranged in a configuration that can be adapted for use in mobile computing, embedded computing, edge computing, etc. In some aspects, the apparatus 100 may be configured to support multiple communication technologies, modes, and/or protocols. In some aspects, the apparatus 100 can include a system-on-chip (SoC) 104, one or more peripheral devices 106, and one or more transceivers 108 that cooperate to enable the apparatus to communicate through one or more antennas 122 with a radio access network (RAN), a core access network, the Internet, and/or another network. In some examples, the apparatus 100 can communicate with another device using a peer-to-peer (P2P) or device-to-device (D2D) connection (e.g., Bluetooth, vehicle-to-vehicle (V2V) connection, or vehicle-to-everything (V2X) connection), or a mesh network.

In some aspects, the SoC 104 may include various circuitry, for example, one or more processors 112, one or more modems 110, one or more memories 114 (e.g., on-board memory), a communication interface circuit 116 (e.g., a bus interface), and/or other logic circuits or functions. The SoC can be controlled by an operating system that provides an application programming interface (API) layer that enables the one or more processors 112 to execute software modules or instructions residing in the one or more memories 114 and/or other processor-readable storage 118 provided on the SoC. The software modules may include instructions and data stored in the one or more memories 114 and/or processor-readable storage 118. The SoC 104 may access its one or more memories 114, the processor-readable storage 118, and/or storage external to the apparatus 100. The one or more memories 114 and the processor-readable storage 118 may include read-only memory (ROM), random-access memory (RAM), electrically erasable programmable ROM (EEPROM), flash memory, or any memory device that can be used in processing systems and computing platforms. The apparatus may include, implement, or have access to a local database or other parameter storage (e.g., tables, database, etc.) that can maintain operational parameters and other information used to configure and operate the apparatus 100 and/or the SoC 104. The local database may be implemented using registers, a database module, flash memory, magnetic media, EEPROM, soft or hard disk, or the like. The SoC 104 may also be coupled to external devices such as the antenna 122, a display, operator controls, switches or buttons, among other components.

The apparatus 100 may provide an interconnect link (e.g., interconnect link 120) that enables communication between different components (e.g., SoC 104, peripheral 106, and/or RF transceiver 108) that can be implemented in one or more dies (e.g., chiplets). In one example, the interconnect link 120 can be a Universal Chiplet Interconnect express (UCIe) link. In some aspects, the interconnect link 120 can operate in a degraded mode in which the interconnect link includes a subset of all lanes excluding one or more faulty lanes (e.g., lane 121). In one example, the SoC 104 may include communication interface circuits 116 coupled to the interconnect. Each of the interface circuits 116 may include a combination of circuits, counters, timers, control logic and other configurable circuits or modules. In one example, certain interconnect interface circuits 116 may be configured to operate in accordance with standards-defined communication specifications or protocols, for example, UCIe link. The apparatus 100 may include or control a power management function that configures and manages the operation of the apparatus 100.

In some aspects, the apparatus 100 may be included in mobile phones, tablet computers, palmtop computers, portable digital assistants (PDAs), portable game consoles, tablets, smartwatches, and other portable electronic devices. The various components and dies (e.g., chiplets) of the apparatus 100 may communicate with each other via one or more intra-chip communication interconnects. The apparatus 100 can be packaged in an integrated circuit (IC) package, which may be referred to as a "semiconductor package" or "chip package." The IC package typically includes a package substrate and one or more IC chips, dies, chiplets, or other electronic modules mounted to the package substrate to provide electrical connectivity to the IC chips, dies, or chiplets. For example, an IC chip in an IC package may be configured as an SoC. The IC chips are electrically coupled to other IC chips and/or to other components in the IC package through electrical coupling to metal lines in the package substrate. The IC chips can also be electrically coupled to other circuits outside the IC package through electrical connections of external metal interconnects (e.g., solder bumps) of the IC package.

Process technology employed to manufacture semiconductor devices, including IC devices, is continually improving. Process technology includes the manufacturing methods used to make IC devices and defines transistor size, operating voltages, and switching speeds. Features that are constituent elements of circuits in an IC device may be referred as technology nodes and/or process nodes. The terms technology node, process node, and process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs. Design rules for newer process technology that use low-voltage transistors may preclude the use of higher voltage transistors supported by previous process technology generations. The unavailability of certain higher-voltage transistors may present an impediment to circuit designers for IC devices that include multiple voltage domains.

Figure 2:
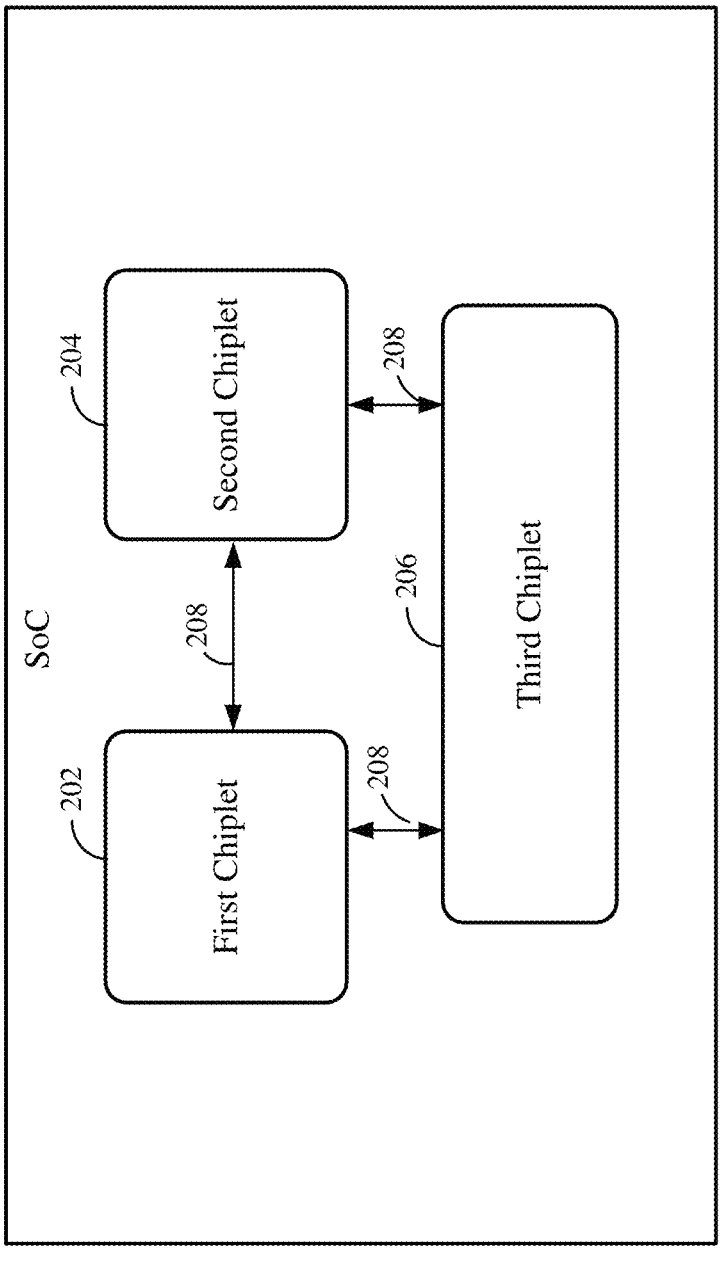
FIG. 2 illustrates certain aspects of an apparatus that can be constructed using chiplets according to some aspects of the disclosure.

FIG. 2 is a block diagram illustrating certain aspects of a system-on-chip (SoC) 200 that can be constructed using chiplets according to some aspects. In some aspects, chiplet technology can be used to address some of the performance, power, and size design requirements for complex systems used in certain mobile or wearable devices. In one example, the SoC 200 may be the SoC 104 of FIG. 1 or any other SoC. The SoC 200 may be configured by selecting a combination of chiplets that implement certain subsystems or distinct functional elements. In the illustrated example, the SoC 200 may include multiple chiplets, for example, a first chiplet 202, a second chiplet 204, and a third chiplet 206 that are connected to each other via interconnect links 208. Each of the chiplets 202, 204, 206 can include a communication interface (e.g., communication interface circuit 116 of FIG. 1) connected to the corresponding interconnect link 208. In other examples, the SoC 200 may include fewer or more chiplets than those shown in FIG. 2. The chiplets can be configured to provide various subsystems or functions of the SoC 200. In some aspects, the interconnect link 208 can be a UCIe link. In this disclosure, two chiplets connected by a UCIe link can be referred as a UCIe module (a first device) and a UCIe module partner (a remote link partner or a second device), respectively.

In some aspects, the UCIe link 208 can support various configurations in terms of the number of lanes, depending on the specific requirements and implementations of the devices involved. For example, the UCIe link 208 can have 8 lanes (×8) or 16 lanes (×16). The chiplets can identify functional lanes within a degraded link and reconfigure the UCIe link using these lanes, thus maintaining the integrity and functionality of the UCIe link.

In some aspects, the SoC 200 may include a variety of processing engines, such as central processing units (CPUs) with multiple cores, graphical processing units (GPUs), digital signal processors (DSPs), neural processing units (NPUs), wireless transceiver units (also referred to as modems), peripherals, display and imaging interfaces, etc. Each of these subsystems and other functional elements can be implemented as an individual chiplet, or as a combination of chiplets (e.g., chiplets 202, 204, and/or 206). The chiplets included in the SoC 200 can be proprietary or may be acquired from a variety of sources. An SoC may be constructed from chiplets manufactured at different process nodes, operated at different voltages, and/or operated at different frequencies. In some aspects, the chiplets can be connected together using 3D or 2.5D chiplet technology. The term "2.5D" refers to a specific approach in semiconductor packaging technology, where multiple ICs (e.g., chiplets) are mounted onto an interposer that sits on top of a substrate. The interposer can be a piece of silicon that includes wiring and sometimes passive devices. The interposer serves as a bridge that connects the chiplets to each other and to the substrate.

Figure 3:
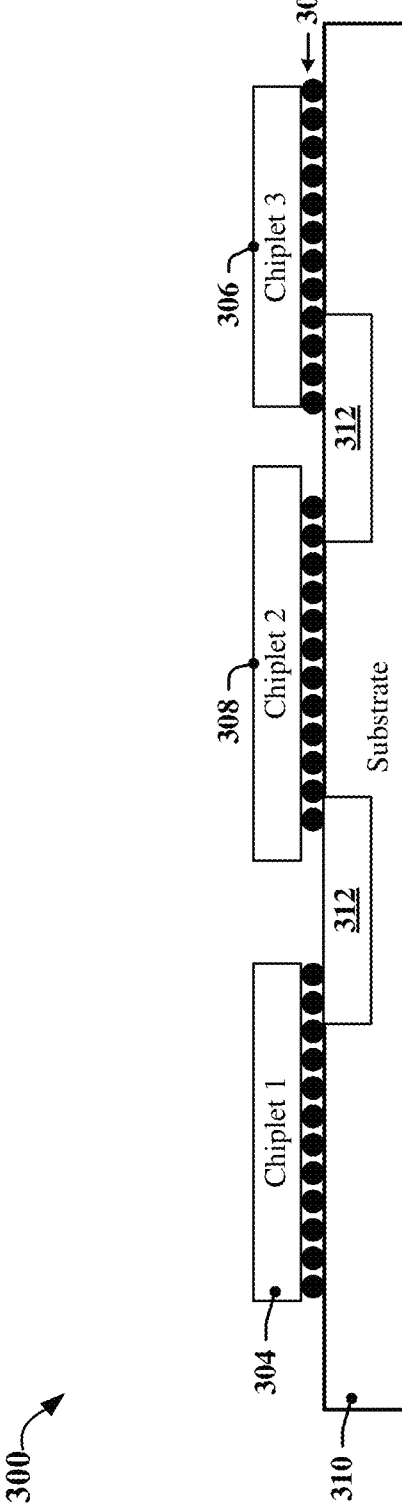
FIG. 3 illustrates an exemplary apparatus in which multiple chiplets are stacked vertically on a substrate according to some aspects of the disclosure.

FIG. 3 illustrates an example of an SoC 300 including a plurality of chiplets according to some aspects of the disclosure. In one example, the SoC 300 include a first chiplet 304, a second chiplet 306, and a third chiplet 308 on a substrate 310. In other examples, some chiplets can be included in stacks that are deployed across the surface of the substrate 310, while other chiplets may be individually mounted on the surface of the substrate 310. In some aspects, chiplets may be mounted on the surface of the substrate using solder balls 302 (e.g., flip chip bumps) that provide electrical and/or thermal coupling between the substrate 310 and the mounted chiplets 304, 306, and 308. An interconnect structure 312 (e.g., a UCIe link) may be formed that enables the chiplets 304, 306, and/or 308 to communicate with one another, with other chiplets or circuitry mounted on the substrate 310, and with input/output structures that connect the SoC 300 with other circuits, displays, imaging sensors, communication interfaces, and other peripherals. In some examples, the SoC 300 may be any of the SoCs described above in FIGS. 1 and 2.

The use of chiplets can reduce the areal size of the substrate 310 and increase three-dimensional packing density. The constituent chiplets may provide complex features and high performance within a smaller form-factor operated at lower power specifications. Moreover, each chiplet may define multiple power domains, operate at different frequencies, and different chiplets may manage power/frequency modes independently. In some instances, two or more chiplets may be operated in mutually exclusive power states. Additionally, operating conditions for an SoC may depend on the type, number, and arrangement of chiplets included on the substrate in addition to the modes of operation defined by applications. It is necessary to consider power usage by all chiplets in the SoC in order to ensure compliance with power budgets assigned for an application or device.

The interconnect or communication link between various chiplets or dies can use a layered protocol. One example of such protocol is the UCIe protocol. Hereafter, aspects of the present disclosure will be presented using a UCIe link and protocol. However, the present disclosure is not limited to the UCIe link and protocol. In other examples, aspects of the disclosure can be implemented using any suitable interconnects and protocols. In some aspects, the UCIe link between the chiplets 304, 306, and 308 can operate in a degraded mode in which the lanes of UCIe link include a subset of all lanes, excluding one or more faulty lanes. A degraded UCIe link does not operate at its full capacity (full data width) or optimal performance. Faulty lanes can be disabled (e.g., deactivated or suspended) to prevent them from causing further communication errors or data corruption. When some lanes are disabled, the overall bandwidth of the UCIe link is reduced. In one example, a UCIe link can have a ×16 link width (e.g., lanes 0-15), and one or more lanes can become faulty. Where lane repair is not supported, resilience against faulty lanes can be provided by configuring the link to a ×8 link width (e.g., lanes 0-7 or lanes 8-15 which exclude the faulty lanes). For example, if one or more faulty lanes are among lanes 0-7, the link can be configured to be a ×8 link using lanes 8-15. The configuration can be done during link initialization or training.

Figure 4:
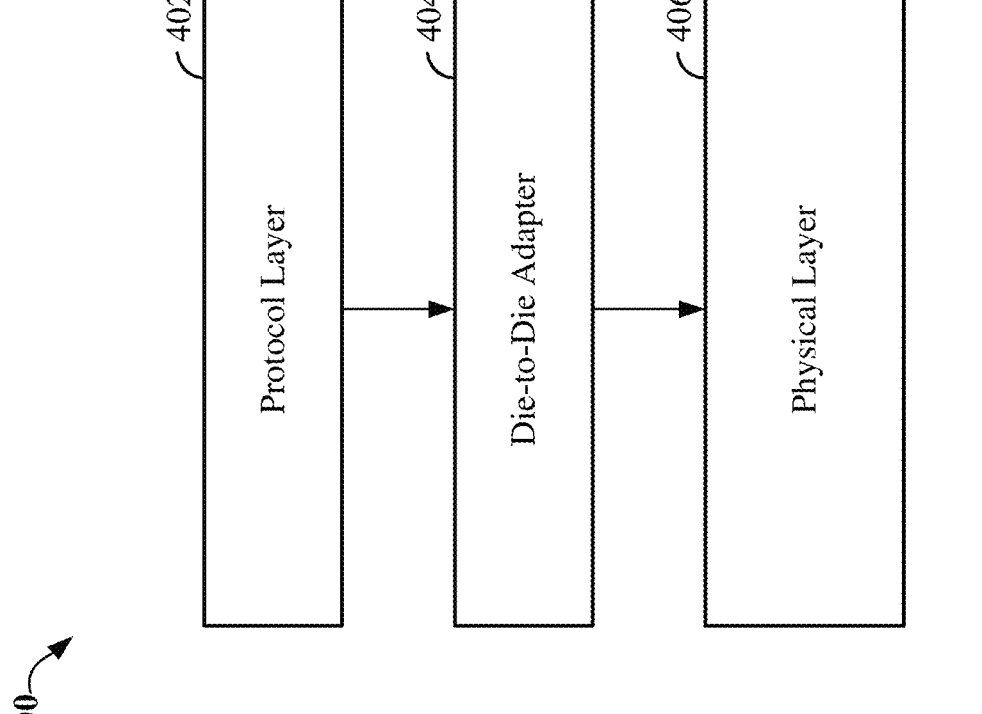
FIG. 4 illustrates an exemplary protocol stack of a Universal Chiplet Interconnect Express (UCIe) link according to some aspects of the disclosure.

FIG. 4 illustrates an exemplary protocol stack 400 of a UCIe link according to some aspects of the disclosure. The protocol stack 400 includes a protocol layer 402, a die-to-die (D2D) adapter layer 404, and a physical (PHY) layer 406. In some aspects, the protocol layer may be application specific. In some examples, the protocol layer 402 can support Peripheral Component Interconnect Express (PCIe), Compute Express Link (CXL), etc. The D2D adapter layer 404 coordinates with the protocol layer 402 and the physical layer 406 to ensure successful data transfer across the UCIe link. The D2D adapter layer 404 is responsible for coordinating higher level link state machine and bring-up, protocol options related to parameter exchanges with the remote link partner, and when supported, power management coordination with the remote link partner.

In some aspects, the physical layer 406 can detect signal integrity issues, lane failures, or other anomalies in the electrical characteristics of the UCIe link. This includes monitoring for excessive noise, loss of signal, or high error rates which might indicate a problem. Upon detecting faults, the physical layer 406 can deactivate faulty lanes to prevent error propagation that can disrupt the UCIe link. After deactivating the faulty lanes, the physical layer 406 along with the upper layers (e.g., die-to-die adapter layer 404, protocol layer 402) can reconfigure the remaining active lanes to continue operation with the reduced number of lanes. The physical layer 406 can report up to higher layers that there has been a degradation in the link, which may trigger further actions at the system level, such as alerts to system administrators or triggering redundant pathways if available. The physical layer 406 can continue to monitor the operational status of the UCIe link to detect any further degradation or confirm the stability of the current configuration. In some aspects, the D2D adapter layer 404 and physical layer 406 can remap logical and physical lanes to maintain a UCIe link that has new faulty lanes while the UCIe link already operates in a degraded mode and lane repair is not available.

Figure 5:
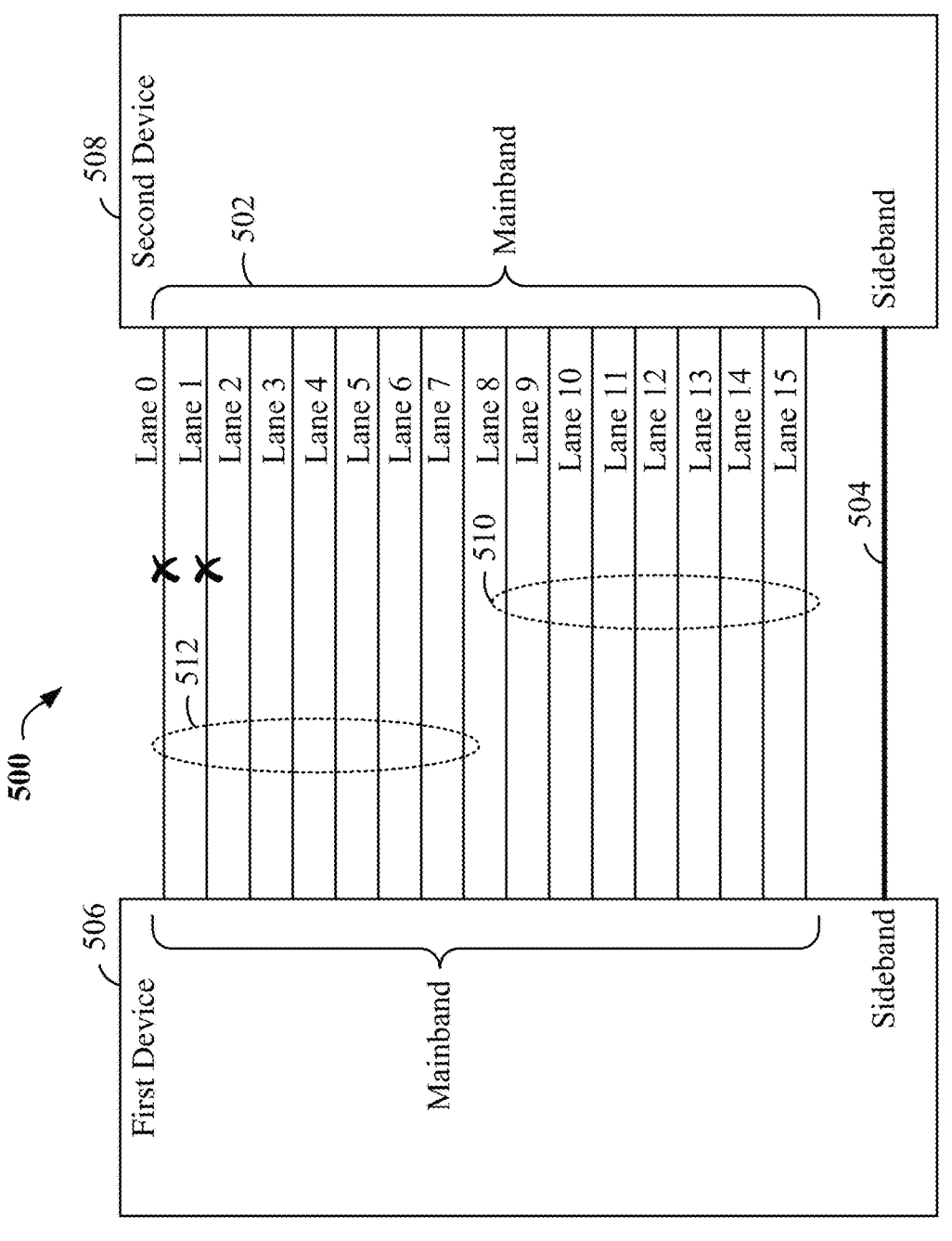
FIG. 5 illustrates an exemplary die-to-die (D2D) interconnect link according to some aspects of the disclosure.

FIG. 5 illustrates an exemplary die-to-die (D2D) interconnect link 500 according to some aspects of the disclosure. In one example, the D2D interconnect link 500 may be a UCIe link including a mainband 502 and a sideband 504 connecting two devices. The mainband of the D2D interconnect link provides the primary communication channel used for high-speed data transfer between chiplets or dies. The sideband channel complements the mainband by handling auxiliary communications and control signals between chiplets or dies. The mainband 502 and the sideband 504 can each have a plurality of lanes. In one example, the mainband can have a link width of ×16 including lanes 0 through 15 that connect a first device 506 with a second device 508. In some aspects, the first and second devices may be UCIe devices (e.g., a UCIe module and a UCIe module partner). In other examples, the link 500 may have fewer or more than 16 lanes. In some aspects, the link 500 may be any of the UCIe links described herein.

In some aspects, when one or more lanes of the link 500 encounter errors or become faulty, the devices can degrade the link 500 to include fewer than all lanes (e.g., sixteen lanes), for example, eight lanes. For example, the devices can exchange messages via the sideband 504 to coordinate the process for degrading the link. In one example, if one or more faulty lanes are present among lanes 0 through 7 (e.g., lanes 0 and 1), the link can be degraded to a ×8 width link including functional lanes 8-15. Similarly, if one or more faulty lanes are present among lanes 8 through 15, the link can be degraded to a ×8 width link including functional lanes 0-7. In some aspects, the reconfiguration can be done during link initialization or retraining, and transmitters of the disabled lanes can go to high impedance (hi-Z) and receivers are disabled.

In some examples, after a UCIe link is already in a degraded mode (e.g., a UCIe link with functional lanes 510 and disabled lanes 512) and a new faulty lane is identified among the functional lanes (e.g., lanes 8-15), the UCIe link can become unusable and the bandwidth becomes zero when the link cannot be further degraded and lane repair is not available. In this case, the UCIe link is not using the functional lanes efficiently.

A UCIe link can provide certain link repair functions to enhance the reliability and efficiency of the interconnects between chiplets. Some of the repair functions include fault detection, link degradation and reconfiguration, utilization of redundant lanes, lane repair and remapping, etc. In some aspects of the disclosure, a UCIe link can be configured to operate in a resilient link (RL) mode in which the UCIe module and module partner keep track of the functional lanes including the disabled lanes (e.g., lanes 512) that are not used for the current UCIe link at the moment. In some aspects, the UCIe link can reuse (or remap) a functional lane from the disabled lanes to replace a faulty lane so that a functional UCIe link can be established or maintained between chiplets (e.g., a UCIe module and a UCIe module partner) in case of additional lane failure in a degraded UCIe link. The resilient link mode enables the UCIe link to continue functioning despite lane failures by using a subset of lanes that remain functional. This mode is particularly useful in scenarios where continuous operation is critical, and it can dynamically adjust to the changing conditions of the lane integrity.

Figure 6:
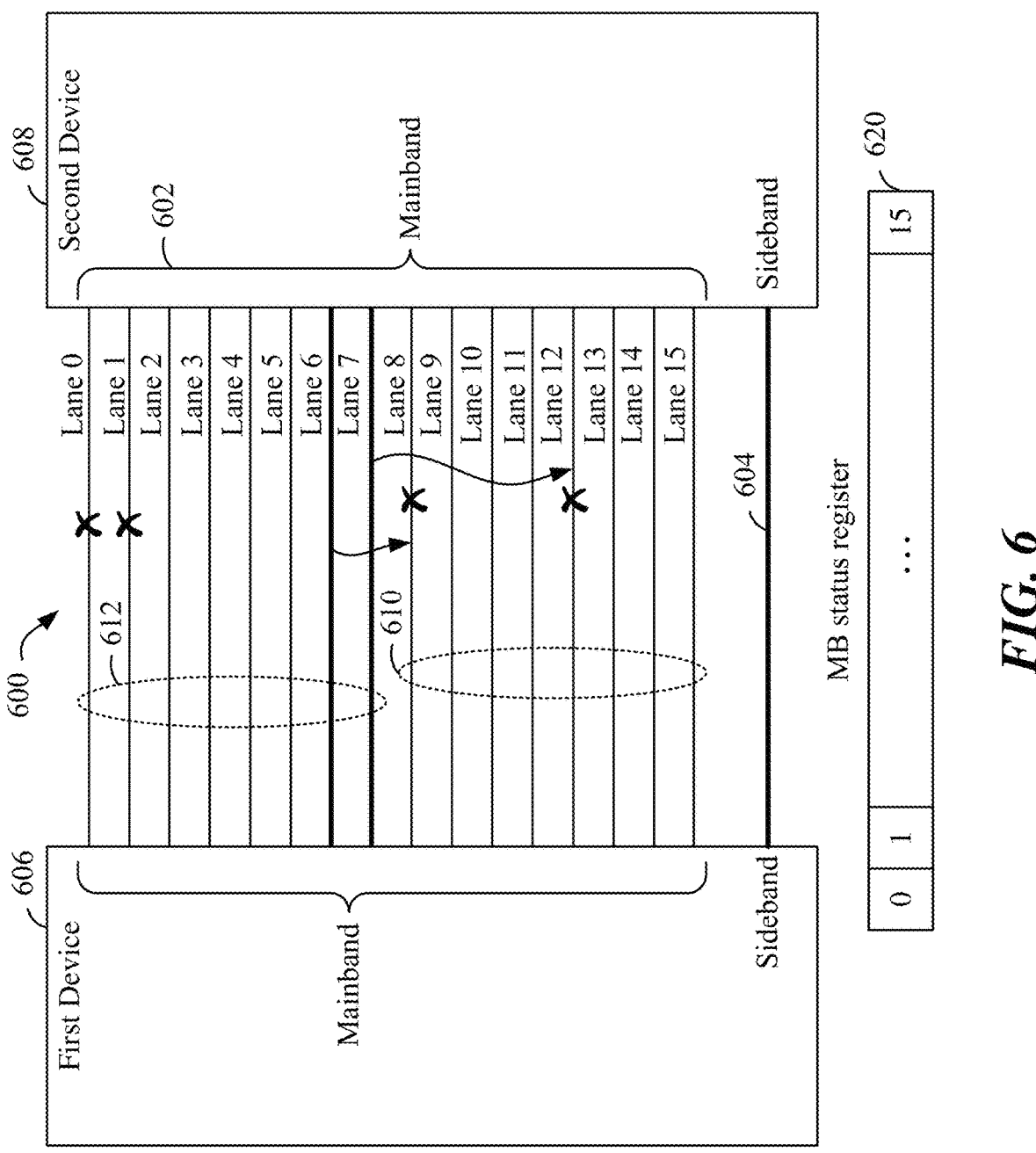
FIG. 6 illustrates an exemplary degraded D2D interconnect link and a mainband status register according to some aspects of the disclosure.

FIG. 6 illustrates an exemplary degraded D2D interconnect link 600 and a mainband status register according to some aspects of the disclosure. In one example, the D2D interconnect link 600 may be a UCIe link that includes a mainband 602 and a sideband 604 connecting a first device 606 to a second device 608. In some examples, the UCIe link 600 may be the UCIe link 500 or any UCIe links.

The UCIe link 600 can operate in a degraded mode when one or more lanes becomes faulty (i.e., not able to transmit data correctly). In one example, the UCIe link 600 can experience lane failures on lanes 0 and 1, leading to a degradation where the link operates with a reduced set of lanes 610 (e.g., lanes 8 through 15), excluding lines 0 through 7 (disabled lanes 612). If one or more additional lane failures (e.g., lanes 8 and 12) occur within the already degraded link, the current UCIe implementation can result in a total loss of communication between the module partners (e.g., devices 606 and 608) despite other lanes remaining functional when the degraded UCIe link cannot be further degraded.

In some aspects, the devices can use a mainband (MB) status register 620 to keep track of which lanes are still functional within the originally disabled lanes. For example, each module or module partner can have a separate MB status register to maintain the status of their corresponding data lanes. In one example, the MB status register 620 can include a plurality of bits (bits 0 through 15) that indicate the status (e.g., bit 1 for a functional lane and bit 0 for a faulty lane) of the lanes. In some aspects, the MB status register 620 can use any coded values or points to indicate the status of the lanes. In one example, lanes 6 and 7 can be functional and can be utilized to replace the faulty lanes 8 and 12, respectively. By reconfiguring or remapping the functional lanes from the disabled lanes, the devices can re-establish or maintain a fully functional degraded UCIe link, thus ensuring the capability for data to be effectively transferred between the devices.

Figure 7:
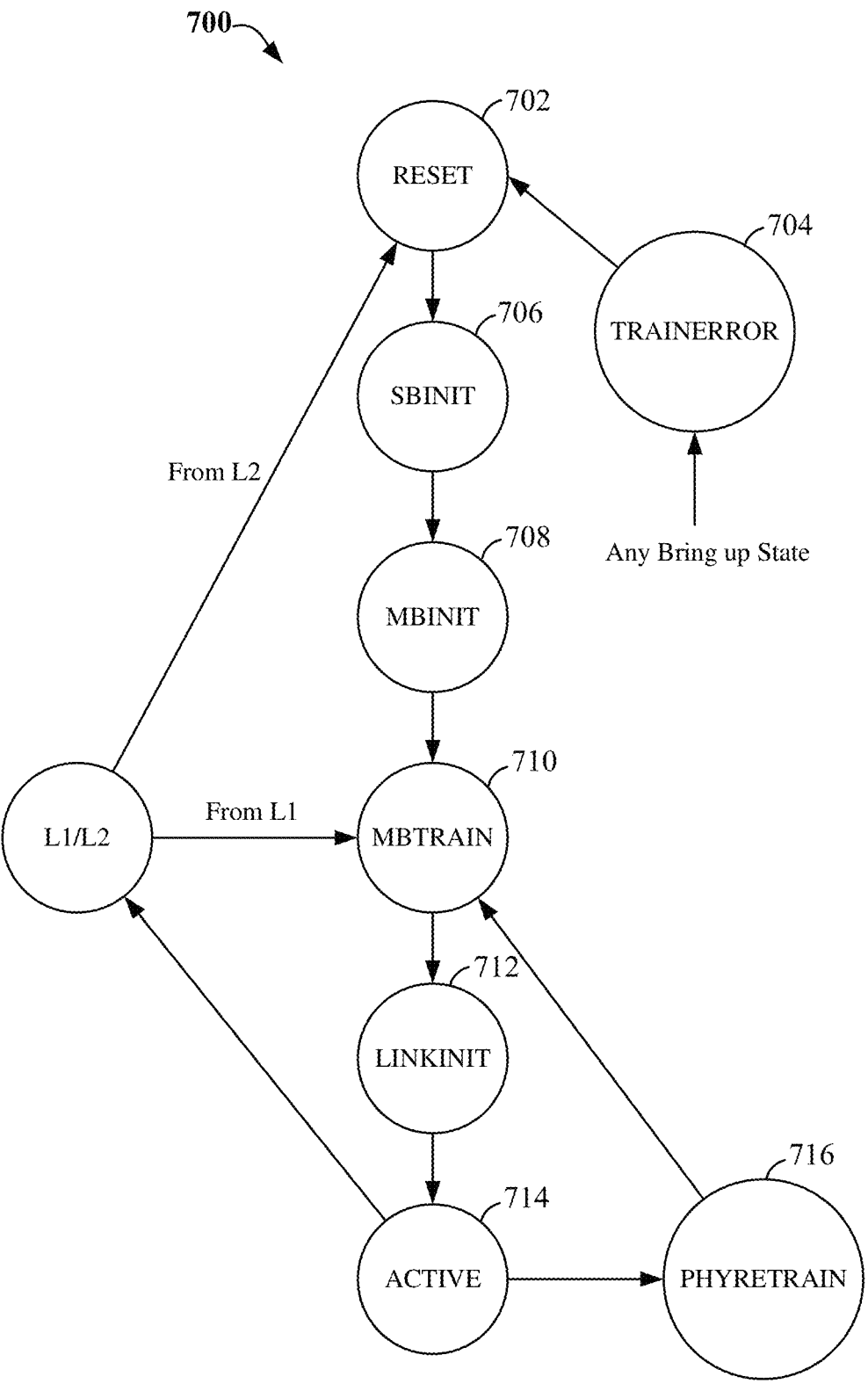
FIG. 7 illustrates an exemplary Link Training and Status State Machine (LTSSM) according to some aspects of the disclosure.

FIG. 7 is a diagram illustrating an exemplary Link Training and Status State Machine (LTSSM) 700 according to some aspects of the disclosure. For example, the LTSSM can reside in a chiplet (e.g., a UCIe module or a UCIe module partner). The LTSSM governs the initialization and training of a D2D interconnect link, for example, a UCIe link. The LTSSM transitions through various states until it reaches the active state, indicating a successfully initialized and trained UCIe link between the devices. During link initialization and training, the UCIe devices can negotiate and agree upon the link width and speed based on their capabilities. Once the link initialization and training process is completed, the UCIe devices can start exchanging data using the established and configured communication link. During link initialization and training, UCIe devices (e.g., a UCIe module and a UCIe module partner) establish a reliable communication link between the devices connected via a UCIe link. The UCIe devices negotiate and configure various parameters to ensure proper communication and data transfer.

RESET 702 is the state following primary reset or exit from TRAINERROR 704. The TRAINERROR state is used as a transitional state due to any fatal or non-fatal events (e.g., linkerror or trainerror) that need to bring the state machine back to the RESET state. Fatal events are severe errors that can result in the termination of the current transaction or the entire UCIe link. A fatal event cannot be recovered or corrected by the UCIe devices. When a fatal event occurs, the affected device or link may be disabled or reset to recover from the error state. Non-fatal events are less severe than fatal events and can often be recovered or corrected without terminating the entire UCIe link or transaction. For example, non-fatal errors can be addressed by retrying the operation or taking corrective actions.

A linkerror refers to a problem or error that occurs at the physical layer of the UCIe interconnect. It indicates a failure or disruption in the communication link between two components (e.g., chiplets or dies) connected through the UCIe link. This can be caused by various factors such as electrical noise, signal integrity issues, timing mismatches, or physical defects in the interconnect itself. A linkerror indicates that the communication channel is not functioning properly and may require troubleshooting or repair. On the other hand, a trainerror is usually related to the process of training or configuring the interconnect for optimal performance. A trainerror indicates that the training process was unsuccessful or encountered an error. It may be caused by issues with signal integrity, channel conditions, or compatibility between the transmitting and receiving components. In summary, linkerror typically refers to a physical layer issue in the interconnect, indicating a problem with the communication link, while trainerror relates to the training process and suggests difficulties in configuring the interconnect for optimal performance.

In some aspects, the TRAINERROR state can be entered from SBINIT 706 when the sideband interface needs to be repaired and from MBINIT 708 when the mainband interface needs to be degraded or repaired. In some aspects, the UCIe adapter can use the PHYRETRAIN state to retrain the lanes due to multiple reasons such as detecting valid framing error or a change is detected in runtime etc., and the link enters the TRAINERROR state only during the occurrence of any fatal or non-fatal events that need to bring the state machine back to RESET state. If sideband is active, a sideband handshake is performed for both devices (e.g., UCIe module and UCIe module partner) to enter TRAINERROR state from any state other than SBINIT. From TRAINERROR, the link can go through initialization and training states (SBINIT and MBINIT) again to repair and/or retrain the link if possible or needed.

SBINIT 706 is the side band initialization state where the side band can be detected, repaired (when applicable), initialized, and an out of reset message is transmitted. MBINIT 708 is a mainband initialization state where mainband (MB) initialization occurs, following sideband initialization in SBINIT 706. The MB can be initialized at the lowest speed. In MBINIT 708, the dies (e.g., chiplets) can perform on-die calibration followed by interconnect repair (when applicable). In MBTRAIN 710, the mainband (e.g., data, clock, and valid signals) speed of operation can be set to the highest negotiated data rate between link partners. In MBTRAIN 710, die-to-die training of the mainband can be performed to center the clock with respect to data. LINKINIT 712 is the state used to exchange adapter and link management messages. ACTIVE 714 is the state in which transactions can be sent and received between link partners. L1/L2 is the power management state. PHYRETRAIN 716 is the state used to begin the retrain flow for the link during runtime.

In some aspects, MBINIT 708 may include a MBINIT.Repair state where the device can update the MB status register 620 of FIG. 6 to indicate functional lanes of a UCIe link. For example, the MB status register can identify lanes 2-7 being functional in an already degraded link and use one of lanes 2-7 to maintain a degraded UCIe link when a new faulty lane is detected.

Figure 8:
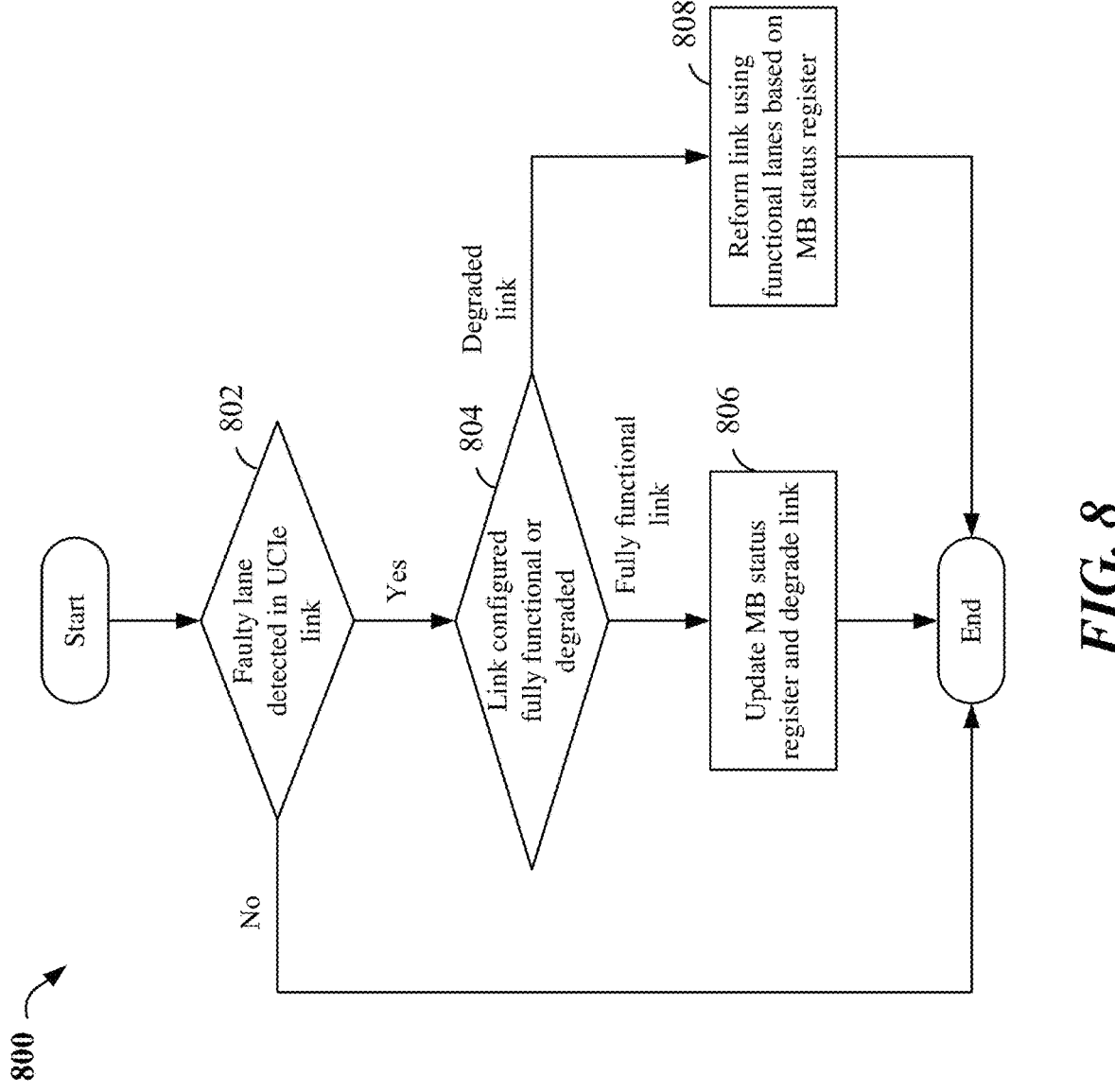
FIG. 8 is a flowchart illustrating a process of configuring a D2D interconnect link using a mainband status register according to some aspects of the disclosure.

FIG. 8 is a flowchart illustrating a process 800 of configuring a D2D interconnect link using a MB status register according to some aspects of the disclosure. In one example, the process 800 can be used to configure the UCIe link described above in relation to FIGS. 1-7 or any UCIe link. In some examples, the process 800 can be used at any of the devices described above in relation to FIGS. 1-7.

At 802, the process can determine whether or not a faulty lane is detected in a UCIe link. For example, the UCIe device can conduct tests during a link training phase (e.g., MBINIT 708 of FIG. 7) to establish the UCIe link, which includes checking for the integrity of each lane. A faulty lane can be identified if it fails the tests. For example, during the initialization and training phases of a UCIe link, the devices can conduct several tests to establish the viability of the lanes. For example, a UCIe module can send the sideband message {MBINIT.REPAIRMB start req} and waits for a response from the UCIe module partner. The UCIe module partner can respond with the sideband message {MBINIT.REPAIRMB start resp}. For example, the UCIe module can perform transmitter initiated data to clock point training on its transmitter lanes.

At 804, after the devices detect one or more faulty lanes, the devices can determine whether the UCIe link is currently configured as a fully functional link (full width) or a degraded link (reduced width). A fully functional link can perform data transfer with all the lanes (e.g., a ×16 link including lanes 0-15) of the UCIe link, and a degraded link with a subset of the lanes (e.g., a ×8 link including lanes 0-7 or lanes 8-15).

At 806, in response to determining that the UCIe link is currently configured as a fully functional link, the devices can update the MB status register and degrade the link. The degraded link can perform data transfer with a subset of lanes not including the faulty lane(s). In one example, the MB status register can include a plurality of bits, with each bit corresponding to one of the lanes. The devices can set a bit to a first value (e.g., a value of 0) to indicate a faulty lane or a second value (e.g., a value of 1) to indicate a functional lane. Then, the devices can degrade the link by disabling a subset of lanes that include the faulty lane(s). In one example, the devices can disable lanes 0-7 where the faulty lane(s) is/are found. In another example, the devices can disable lanes 8-15 where the faulty lane(s) is/are found.

At 808, for an already degraded link, the devices can reform the link using functional lanes from disabled lanes based on the MB status register. For example, the devices can detect one or more faulty lanes (e.g., lanes 8 and 12) among lanes 8-15 used by the degraded link, and the devices can use functional lanes from the disabled lanes (e.g. lanes 0-7) to reconfigure the link. The devices can use the MB status register to select the functional lanes to reform the link. For example, the MB status register can indicate that lanes 6 and 7 are functional among the disabled lanes. In this case, the devices can use lanes 6 and 7 of the disabled lanes to replace the faulty lanes 8 and 12 of the degraded link. In this case, the devices can operate the UCIe link in a resilient link mode that can remap functional lanes from disabled lanes to replace faulty lanes of a degraded link.

In some aspects, the faulty lanes detected in the fully functional UCIe link may not be contiguous. For example, the faulty lines may be lanes that are in different subsets of lanes (e.g., lane 0 in a first subset including lanes 0-7 and lane 8 in a second subset including lanes 8-15). In this case, the devices can form a degraded UCIe link by including functional lanes from different subsets of lanes. In one example, the degraded link can include lanes 1-7 and any lane among lanes 9-15. In another example, the degraded link can include lines 9-15 and any lane among lanes 1-7. In other examples, the degraded link can be formed using any combination of the functional lanes.

Figure 9:
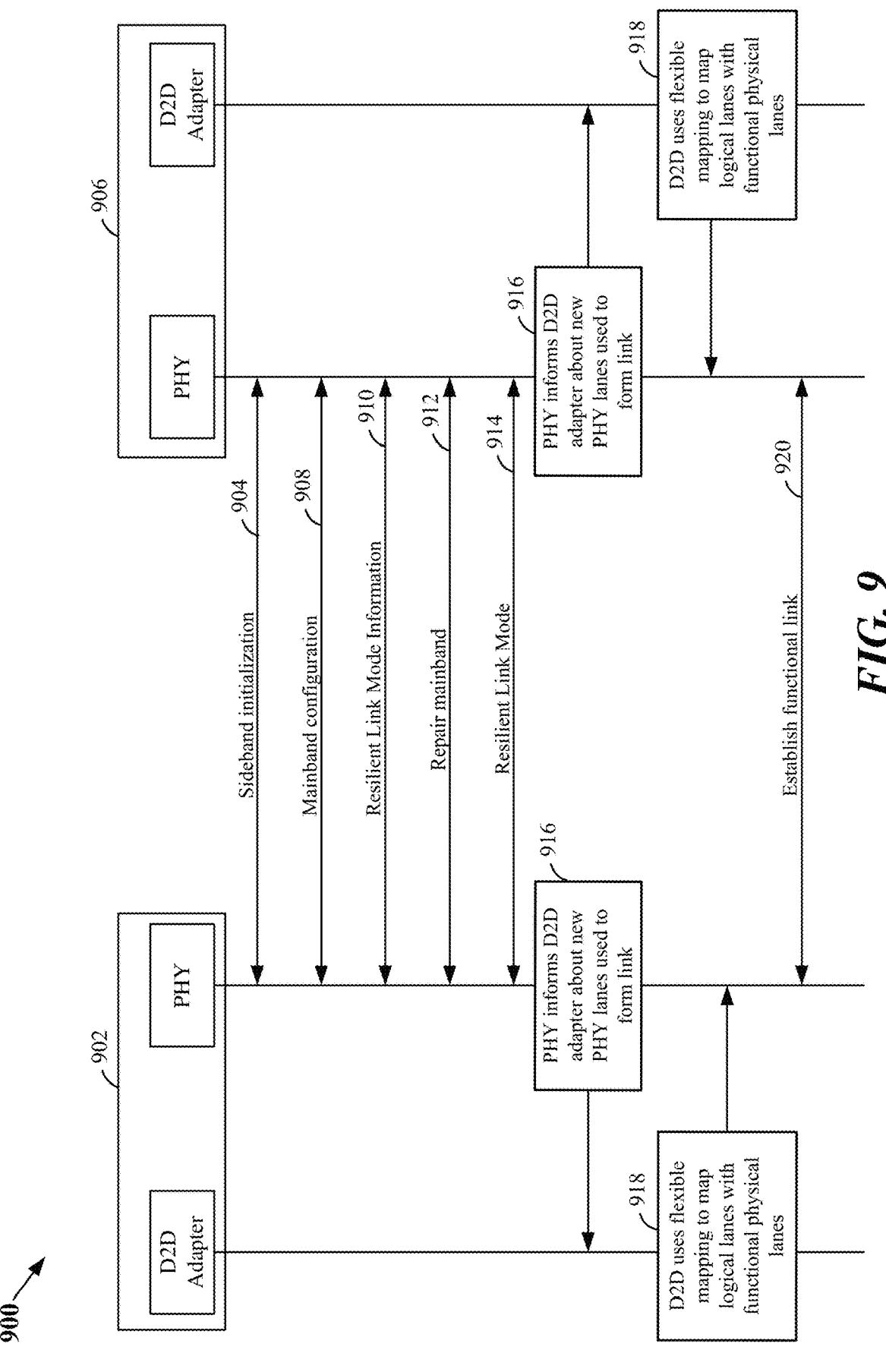
FIG. 9 is a diagram illustrating signaling for establishing a D2D interconnect link using a resilient link mode according to some aspects of the disclosure.

FIG. 9 is a diagram illustrating signaling 900 for establishing a D2D interconnect link using a resilient link mode according to some aspects of the disclosure. In some aspects, the UCIe devices can use the signaling 900 to configure a UCIe link as described above in relation to FIGS. 1-8 or any UCIe links. In some examples, the signaling 900 can be used by any of the devices described above in relation to FIGS. 1-3.

Referring to FIG. 9, a first device 902 can perform sideband initialization 904 with a second device 906. The first device can be a UCIe module and the second device can be a UCIe module partner. Each of the devices can use a protocol stack including a D2D adapter layer and a PHY layer similar to those described in relation to FIG. 4. In one example, the devices can perform sideband initialization in SBINIT 706 of FIG. 7. During sideband initialization, the devices can set up a non-data communication pathway (sideband) that manages various control and management tasks between the devices. For example, the devices can exchange information about their capabilities, such as supported protocols, bandwidth, and operational features, through the sideband channels (e.g., sideband 504 of FIG. 5).

Then, the devices can perform mainband configuration 908 including exchanging mainband parameters (e.g., MBINIT.PARAM configuration) that can be used to set up the link speed and other PHY layer settings of a mainband, for example, in MBINIT 708 of FIG. 7. In some aspects, the devices can exchange resilient link mode information 910 (e.g., MBINIT.PARAM Resilient Link Mode configuration) to configure a resilient link mode, if supported by both devices, as described above in relation to FIGS. 5-8. For example, the first device 902 can transmit a resilient link mode request to the second device 906 to indicate whether the first device supports the resilient link mode or not. Then, the second device can transmit a resilient link mode response to the first device to indicate whether the second device supports the resilient link mode or not. If both devices can support the resilient link mode, the devices can enable the resilient link mode for the UCIe link.

Then, the devices can exchange messages 912 to detect and repair (if needed) faulty lanes of the mainband, for example, in a mainband repair state (e.g., MBINIT.REPAIR). The first device can send a MBINIT.REPAIRMB. start_req message to the second device and wait for a MBINIT.REPAIRMB.start_resp message from the second device. If lane repair is needed and the repair resources are available, the first device can repair its mainband and send a MBINIT.REPAIRMB_apply_repair_req message to the second device. Upon receiving this sideband message, the second device can apply repair on its mainband and send a MBINIT.REPAIRMB_apply_repair_resp sideband message to the first device. In some cases, when the number of lane failures are greater than the repair capability of the devices, the mainband is unrepairable or cannot be degraded.

When the devices cannot repair and/or degrade the UCIe link, the devices can exchange messages 914 to enable the resilient link mode to maintain the link connection. In some aspects, the first device can send a resilient link mode start message (e.g., MBINIT.REPAIRMB_resilient_link_mod-e_start_req) to request the second device to start the resilient link mode. The resilient link mode start message can indicate the functional lane(s) that is/are selected from disabled lanes to replace the faulty lane(s). In one example, the first device can select lanes 6 and 7 from disabled lanes 0-7 to replace faulty lanes 8 and 12 (see FIG. 6). In response, the second device can send a resilient link mode response message (e.g., MBINIT.REPAIRMB_resilient_link_mode start_response) to the first device to indicate that the second device can use the selected lanes to replace the faulty lanes. The devices can handshake to determine which lane(s) from the disabled lanes can be used for the subsequent link formation.

For example, the PHY layer in the devices can select the physical lanes and communicate the chosen lanes to the D2D adapter. At 916, the PHY layer can inform the D2D adapter about the new physical lanes (e.g., lanes 6, 7, 9, 10, 11, 13, 14, and 15 for a ×8 link) to be used to form the UCIe link. At 918, then the D2D adapter can use flexible mapping to map logical lanes with the functional physical lanes that form the UCIe link. Logical lanes refer to the virtual or logical representation of the data pathways within the UCIe protocol. The UCIe protocol use logical lanes as an abstraction to manage and route data across physical lanes. For example, the UCIe protocol can use the logical lanes to handle data packetization, flow control, and error management over a UCIe link. At a UCIe device, each logical lane is mapped to a physical lane that provides the physical connection to another UCIe device. In some aspects, the device can remap a logical lane (e.g., L0-L7) to any physical lanes (e.g., P0-P15). At 920, the devices can establish a functional UCIe link using the resilient link mode. For example, signaling may be used between the devices to indicate successful link formation in response to remapping a logical lane to a functional physical lane. In the resilient link mode, the UCIe link can be formed using physical lanes that are not contiguous, for examples, lanes 6, 7, 9, 10, 11, 13, 14, and 15 for a ×8 link. The non-contiguous physical lanes can be mapped to the contiguous logical lanes (e.g., L0-L7). In this case, the UCIe link in resilient link mode can include lanes remapped from the disabled lanes 0-7.

Figure 10:
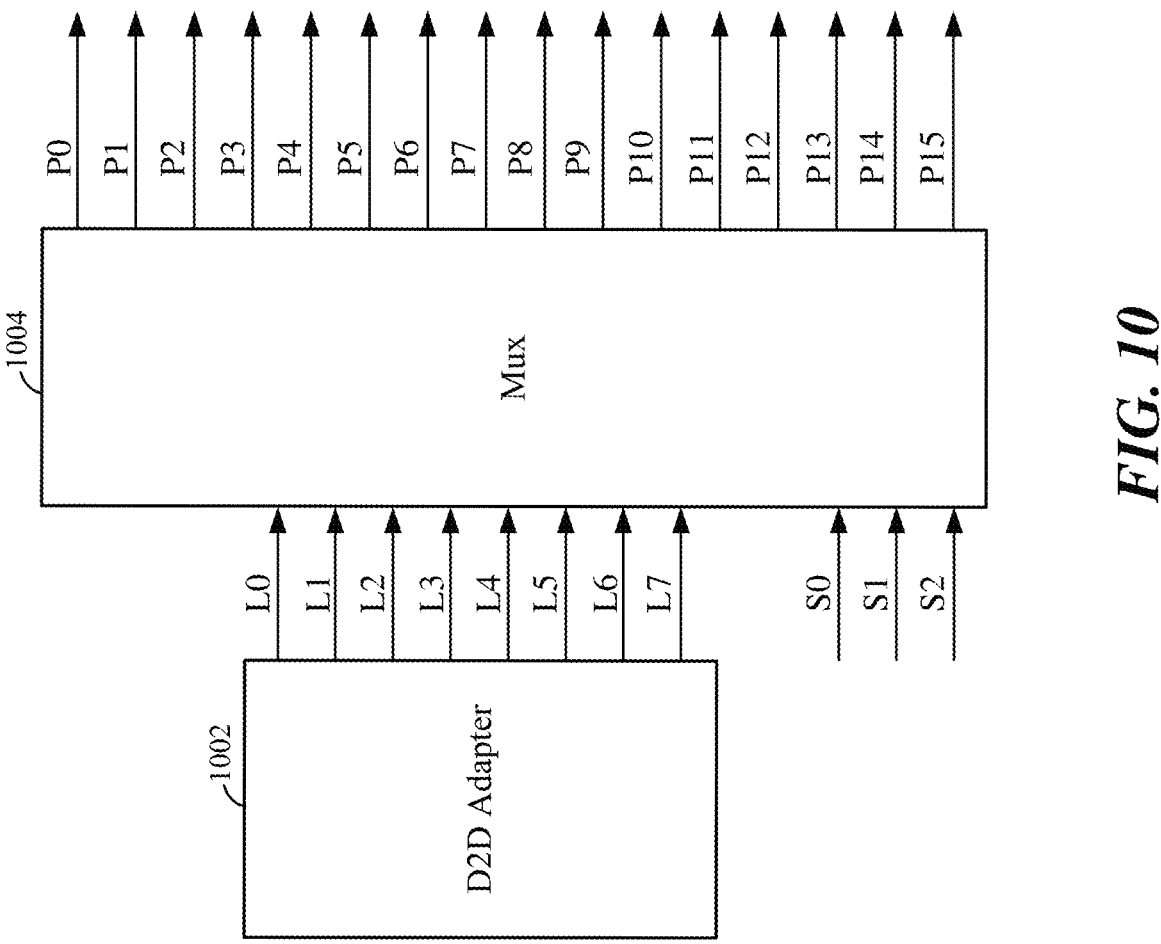
FIG. 10 is a block diagram illustrating an example of logical lanes and physical lanes mapping of a degraded UCIe link according to some aspects of the disclosure.

FIG. 10 is a block diagram illustrating an example of logical lanes and physical lanes mapping of a degraded UCIe link according to some aspects of the disclosure. In one example, the degraded UCIe link can be the D2D interconnect link 600 of FIG. 6 using a resilient link mode. The degraded UCIe link can perform data transfer with a subset (enabled lanes) of all physical lanes (e.g., any eight lanes from P0 to P15) that can be mapped to a plurality of logical lanes (e.g., L0 and L7) based on a mainband (MB) status register (e.g., MB status register 620 of FIG. 6). The MB status register enables a UCIe device to map logical lanes to non-contiguous physical lanes to maintain a UCIe link even when each subset of physical lanes has a faulty lane. For example, the UCIe link can have 16 physical lanes P0 to P15 that can be separated into two subsets each including contiguous physical lanes (e.g., P0 to P7 for a first subset and P8 to P15 for a second subset). A degraded UCIe link can be initially configured to operate using one of the subsets (e.g., P0 to P7 or P8 to P15) as the enabled physical lanes, and the physical lanes of the other subset are disabled. If a new faulty lane is detected among the enabled lanes, a D2D adapter 1002 can remap the logical lane mapped to the faulty physical lane to a new physical lane using a multiplexer 1004 and the MB status register.

In some aspects, the MB status register can indicate whether a physical lane is functional or not among all physical lanes including both currently enabled and disabled physical lanes. When one or more enabled physical lanes become faulty (i.e., non-functional), a UCIe module and a UCIe module partner can communicate (e.g., sideband handshake) to select an appropriate functional lane from the physical lanes that have been disabled (e.g., P0 through P7) to replace the faulty lane found among the currently enabled physical lanes. For example, the PHY layer is responsible for relaying the selection of a functional physical lane from the disabled lanes to the D2D adapter layer. The newly selected physical lane can be logically associated with a logical lane to replace the faulty lane through a flexible mapping process managed by a D2D adapter 1002. In one example, this mapping can be facilitated by utilizing an 8×16 multiplexer 1004, which features eight data inputs for the logical lanes (L0 to L7) and sixteen output lines for the physical lanes (P0 to P15). The specific input-to-output routing is determined by select lines (S0, S1, and S2).

Figure 11:
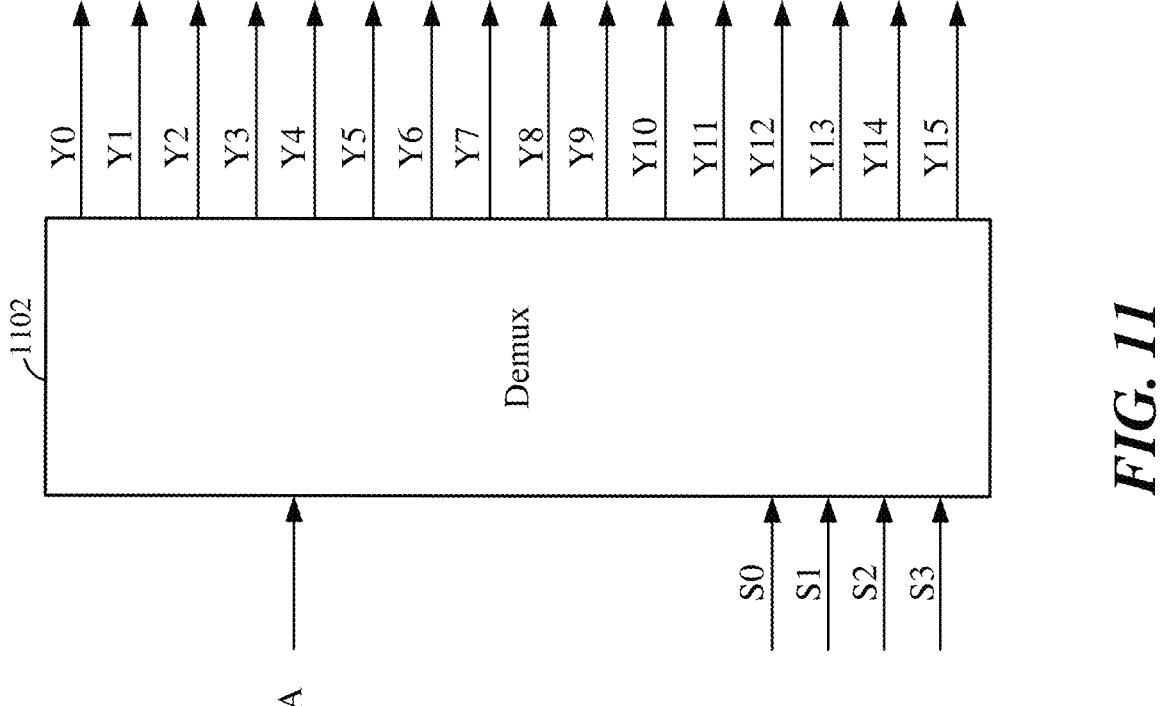
FIG. 11 is a block diagram illustrating an example of remapping a functional lane of a degraded UCIe link according to some aspects of the disclosure.

FIG. 11 is a block diagram illustrating an example of remapping a logical lane of a degraded UCIe link using a demultiplexer 1102 according to some aspects of the disclosure. In one example, the degraded UCIe link can be the D2D interconnect link 600 of FIG. 6 that is already configured to operate in a resilient link mode. The logical lane (A) of the demultiplexer 1102 can be a logical lane of the degraded UCIe link, and the outputs of the demultiplexer are connected to a plurality of physical lanes (Y0 to Y15). The UCIe module or UCIe module partner can use the demultiplexer 1102 (e.g., a 1:16 demux) to remap the logical lane A to any one of the 16 physical lanes (Y0 to Y15) of the UCIe link. The specific input-to-output routing is determined by select lines (S0, S1, S2, and S3). In one example, the demultiplexer 1102 can be used to map a logical lane to a physical lanes selected by the select lines.

FIG. 12 is a flow chart illustrating a method 1200 for operating a D2D interconnect link in a resilient link mode according to some aspects of the disclosure. For example, the method 1200 can be used by a device (e.g., SoC 104 of FIG. 1 or SoC 200 of FIG. 2) to operate a degraded UCIe link between chiplets (e.g., a UCIe module and a UCIe module partner) described above in relation to FIGS. 1-11.

At 1202, the device can operate, in a resilient link mode, a degraded die-to-die (D2D) interconnect link between a UCIe module (e.g., a first chiplet) and a UCIe module partner (e.g., a second chiplet). The device can configure the degraded D2D interconnect link to provide a plurality of enabled lanes and a plurality of disabled lanes. For example, the device can store the functional status of each lane (both disabled and enabled lanes) in a MB status register 620 (FIG. 6). The device can communicate with another device using the degraded D2D interconnect link (via enabled lanes), and the disabled lanes are not used for data communication between the devices. In one example, in the degraded mode, the D2D interconnect link can be a UCIe link that is configured to use a subset of all lanes (e.g., lanes 8-15 enabled with lanes 0-7 disabled). A degraded UCIe link is not operating at its full capacity (e.g., full link width) or optimal performance. In one example, the SoC 104 of FIG. 1 can provide a means to operate the D2D interconnect link in the resilient link mode.

At 1204, the device can detect a faulty lane among the plurality of enabled lanes. In one example, the degraded UCIe link can have a ×8 link width (e.g., lanes 8-15 enabled). During operation, the device can find one or more of the enabled lanes faulty. For example, the PHY layer (e.g., the physical layer 406 of FIG. 4) can provide a means to detect a faulty lane based on signal integrity and/or other electrical characteristics of the lane. This includes monitoring for excessive noise, loss of signal, and/or high error rates which might indicate a faulty lane.

At 1206, the device can replace the faulty lane using a functional lane from the plurality of disabled lanes to maintain the degraded D2D interconnect link. For example, the disabled lanes can include lanes 0-7, and the operational lanes can include lanes 8-15. For example, the device can determine one or more functional lanes among the disabled lanes based on the MB status register. Therefore, when one of the enabled lanes becomes faulty, the device can replace the faulty lane with a functional lane selected from the disabled lanes. In one aspect, the SoC 104 can provide a means to replace the faulty lane. For example, the PHY layer can inform the D2D adapter layer about the new physical lanes to be used to form the link. Then the D2D adapter layer can remap the logical lanes with new functional physical lanes.

In one configuration, the apparatus 100 includes the various means for performing the processes and techniques described above in FIG. 12. The aforementioned means may be the processor(s) 112 in which the invention resides shown in FIG. 1 configured to perform the functions recited by the aforementioned means. In another aspect, the aforementioned means may be a circuit or any apparatus configured to perform the functions recited by the aforementioned means.

Of course, in the above examples, the processor 112 is merely provided as an example, and other means for carrying out the described functions may be included within various aspects of the present disclosure, including but not limited to the instructions stored in a computer-readable storage medium (e.g., storage 118 of FIG. 1), or any other suitable apparatus or means described in any one of the FIGS. 1-12, and utilizing, for example, the processes and/or algorithms described herein in relation to FIGS. 1-12.

Some implementation examples are described in the following numbered clauses:

Example 1: A method for managing a faulty lane of a die-to-die interconnect link, comprising: operating a degraded die-to-die (D2D) interconnect link between a first device and a second device, the degraded D2D interconnect link configured to provide a plurality of enabled lanes and a plurality of disabled lanes; detecting a faulty lane among the plurality of enabled lanes; and replacing the faulty lane using a functional lane from the plurality of disabled lanes to maintain the degraded D2D interconnect link in a resilient link mode.

Example 2: The method of example 1, further comprising: enabling the resilient link mode in response to determining that the degraded D2D interconnect link cannot be repaired and further degraded.

Example 3: The method of example 1, further comprising: initiating, at the first device, a handshake with the second device to operate the degraded D2D interconnect link in the resilient link mode during a mainband initialization state of the degraded D2D interconnect link.

Example 4: The method of example 3, wherein: the plurality of enabled lanes correspond to a mainband of the degraded D2D interconnect link; and the handshake comprises sideband messages.

Example 5: The method of example 1, 2, 3, or 4 further comprising: training the degraded D2D interconnect link; and updating a lane status register to indicate the functional lane based on the training of the degraded D2D interconnect link.

Example 6: The method of example 5, wherein the replacing the faulty lane comprises: remapping a connection between a logical lane corresponding to the faulty lane and the functional lane from the plurality of disabled lanes based on the lane status register.

Example 7: The method of example 6, further comprising: signaling, between the first device and the second device, to indicate successful link formation in response to remapping the logical lane to the functional lane.

Example 8: The method of example 6, wherein the remapping comprises: routing the connection between the logical lane and the functional lane using at least one of a multiplexer or demultiplexer controlled based on the lane status register.

Example 9: The method of example 1, 2, 3, or 4 wherein the degraded D2D interconnect link comprises non-contiguous physical lanes that are mapped to contiguous logical lanes.

Example 10: An integrated circuit (IC) device comprising: a plurality of chiplets comprising a first device and a second device; a die-to-die (D2D) interconnect link connected between the first device and the second device; and a link training and status state machine (LTSSM) configured to: operate the D2D interconnect link to provide a plurality of enabled lanes and a plurality of disabled lanes; detect a faulty lane among the plurality of enabled lanes; and replace the faulty lane using a functional lane from the plurality of disabled lanes to maintain the D2D interconnect link in a resilient link mode.

Example 11: The IC device of example 10, wherein the LTSSM is further configured to: enable the resilient link mode in response to determining that the D2D interconnect link cannot be repaired and further degraded.

Example 12: The IC device of example 10, wherein the LTSSM is further configured to: initiate a handshake between the first device and the second device to operate the degraded D2D interconnect link in the resilient link mode during a mainband initialization state of the degraded D2D interconnect link.

Example 13: The IC device of example 12, wherein: the plurality of enabled lanes correspond to a mainband of the degraded D2D interconnect link; and the handshake comprises sideband messages.

Example 14: The IC device of example 10, 11, 12, or 13, wherein the LTSSM is further configured to: train the degraded D2D interconnect link; and update a lane status register to indicate the functional lane based on the training of the degraded D2D interconnect link.

Example 15: The IC device of example 14, where the LTSSM is further configured to: remap a connection between a logical lane corresponding to the faulty lane and the functional lane from the plurality of disabled lanes based on the lane status register, to replace the faulty lane.

Example 16: The IC device of example 15, wherein the LTSSM is further configured to: signal, between the first device and the second device, to indicate successful link formation in response to remapping the logical lane to the functional lane.

Example 17: The IC device of example 15, wherein, the LTSSM is further configured to: route the connection between the logical lane and the functional lane using at least one of a multiplexer or a demultiplexer controlled based on the lane status register, to remap the connection.

Example 18: The IC device of example 10, 11, 12 or 13, wherein the degraded D2D interconnect link comprises non-contiguous physical lanes that are mapped to contiguous logical lanes.

Example 19: A system-on-chip (SoC) comprising: means for operating a die-to-die (D2D) interconnect link as a degraded link comprising a plurality of enabled lanes and a plurality of disabled lanes; means for detecting a faulty lane among the plurality of enabled lanes; and means for replacing the faulty lane using a functional lane from the plurality of disabled lanes to maintain the D2D interconnect link in a resilient link mode.

Example 20: The SoC of example 19, further comprising: means for initiating a handshake between the first device and the second device to operate the degraded D2D interconnect link as the degraded link during a mainband initialization state of the degraded D2D interconnect link.

Example 21: The SoC of example 20, wherein: the plurality of enabled lanes correspond to a mainband of the degraded D2D interconnect link; and the handshake comprises sideband messages.

Example 22: The SoC of example 19, 20, or 21, further comprising: means for training the degraded D2D interconnect link; and means for updating a lane status register to indicate the functional lane based on the training of the degraded D2D interconnect link.

Example 23: The SoC of example 22, further comprising: means for remapping a connection between a logical lane corresponding to the faulty lane and the functional lane from the plurality of disabled lanes based on the lane status register.

Example 24: The SoC of example 23, further comprising: means for signaling, between the first device and the second device, to indicate successful link formation in response to remapping the logical lane to the functional lane.

Example 25: The SoC of example 23, further comprising: means for routing the connection between the logical lane and the functional lane using at least one of a multiplexer or a demultiplexer controlled based on the lane status register.

Example 26: The SoC of example 19, 20, or 21, wherein the degraded D2D interconnect link comprises non-contiguous physical lanes that are mapped to contiguous logical lanes.

Example 27: An integrated circuit device comprising: a first die; a second die; and a die-to-die (D2D) interconnect link connected between the first die and the second die, the first die comprising: a communication interface connected to the degraded D2D interconnect link; and one or more processors connected to the communication interface, the one or more processors being configured to: operate the D2D interconnect link as a degraded link comprising a plurality of enabled lanes and a plurality of disabled lanes; detect a faulty lane among the plurality of enabled lanes; and replace the faulty lane using a functional lane from the plurality of disabled lanes to maintain the D2D interconnect link in a resilient link mode.

Example 28: The integrated circuit device of example 27, wherein the one or more processors are further configured to: initiate a handshake with the second die to operate the degraded D2D interconnect link in the resilient link mode during a mainband initialization state of the degraded D2D interconnect link.

Example 29: The integrated circuit device of example 28, wherein: the plurality of enabled lanes correspond to a mainband of the degraded D2D interconnect link; and the handshake comprises sideband messages.

Example 30: The integrated circuit device of example 27, 28, or 29, wherein the one or more processors are further configured to: train the degraded D2D interconnect link; and update a lane status register to indicate the functional lane based on the training of the degraded D2D interconnect link.

Example 31: The integrated circuit device of example 30, wherein to replace the faulty lane, the one or more processors are further configured to: remap a connection between a logical lane corresponding to the faulty lane and the functional lane from the plurality of disabled lanes based on the lane status register.

Example 32: The integrated circuit device of example 31, wherein the one or more processors are further configured to: signal, the second die, to indicate successful link formation in response to remapping the logical lane to the functional lane.

Example 33: The integrated circuit device of example 31, wherein to remap the connection, the one or more processors are further configured to: remap the connection between the logical lane and the functional lane using at least one of a multiplexer or demultiplexer controlled based on the lane status register.

Example 34: The integrated circuit device of example 27, wherein the degraded D2D interconnect link comprises non-contiguous physical lanes that are mapped to contiguous logical lanes.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

What is claimed is:

1. A method for managing a faulty lane of a die-to-die interconnect link, comprising:

operating a degraded die-to-die (D2D) interconnect link between a first device and a second device, the degraded D2D interconnect link configured to provide a plurality of enabled lanes and a plurality of disabled lanes;

detecting a faulty lane among the plurality of enabled lanes;

replacing the faulty lane using a functional lane from the plurality of disabled lanes to maintain the degraded D2D interconnect link in a resilient link mode; and initiating, at the first device, a handshake with the second device to operate the degraded D2D interconnect link in the resilient link mode during a mainband initialization state of the degraded D2D interconnect link.

2. The method of claim 1, further comprising: enabling the resilient link mode in response to determining that the degraded D2D interconnect link cannot be repaired and further degraded.

3. The method of claim 1, wherein:

the plurality of enabled lanes correspond to a mainband of the degraded D2D interconnect link; and the handshake comprises sideband messages.

4. The method of claim 1, further comprising:

training the degraded D2D interconnect link; and updating a lane status register to indicate the functional lane based on the training of the degraded D2D interconnect link.

5. The method of claim 4, wherein the replacing the faulty lane comprises:

remapping a connection between a logical lane corresponding to the faulty lane and the functional lane from the plurality of disabled lanes based on the lane status register.

6. The method of claim 5, further comprising:

signaling, between the first device and the second device, to indicate successful link formation in response to remapping the logical lane to the functional lane.

7. The method of claim 5, wherein the remapping comprises:

routing the connection between the logical lane and the functional lane using at least one of a multiplexer or demultiplexer controlled based on the lane status register.

8. The method of claim 1, wherein the degraded D2D interconnect link comprises non-contiguous physical lanes that are mapped to contiguous logical lanes.

9. An integrated circuit (IC) device comprising:

a plurality of chiplets comprising a first device and a second device;

a die-to-die (D2D) interconnect link connected between the first device and the second device; and a link training and status state machine (LTSSM) configured to:

operate the D2D interconnect link to provide a plurality of enabled lanes and a plurality of disabled lanes;

detect a faulty lane among the plurality of enabled lanes;

replace the faulty lane using a functional lane from the plurality of disabled lanes to maintain the D2D interconnect link in a resilient link mode; and initiate a handshake between the first device and the second device to operate the D2D interconnect link in the resilient link mode during a mainband initialization state of the D2D interconnect link.

10. The IC device of claim 9, wherein the LTSSM is further configured to:

enable the resilient link mode in response to determining that the D2D interconnect link cannot be repaired and further degraded.

11. The IC device of claim 9, wherein:

the plurality of enabled lanes correspond to a mainband of the D2D interconnect link; and the handshake comprises sideband messages.

12. The IC device of claim 9, wherein the LTSSM is further configured to:

train the D2D interconnect link; and update a lane status register to indicate the functional lane based on the training of the D2D interconnect link.

13. The IC device of claim 12, wherein the LTSSM is further configured to:

remap a connection between a logical lane corresponding to the faulty lane and the functional lane from the plurality of disabled lanes based on the lane status register, to replace the faulty lane.

14. The IC device of claim 13, wherein the LTSSM is further configured to:

signal, between the first device and the second device, to indicate successful link formation in response to remapping the logical lane to the functional lane.

15. The IC device of claim 13, wherein the LTSSM is further configured to:

route the connection between the logical lane and the functional lane using at least one of a multiplexer or a demultiplexer controlled based on the lane status register, to remap the connection.

16. The IC device of claim 9, wherein the D2D interconnect link comprises non-contiguous physical lanes that are mapped to contiguous logical lanes.

17. A system-on-chip (SoC) comprising:

means for operating a die-to-die (D2D) interconnect link as a degraded link comprising a plurality of enabled lanes and a plurality of disabled lanes, the D2D interconnect link configured to communicate data between a plurality of chiplets of the SoC using a Universal Chiplet Interconnect Express (UCIe) protocol;

means for detecting a faulty lane among the plurality of enabled lanes;

means for replacing the faulty lane using a functional lane from the plurality of disabled lanes to maintain the D2D interconnect link in a resilient link mode; and means for initiating a handshake between a first device and a second device to operate the D2D interconnect link as the degraded link during a mainband initialization state of the D2D interconnect link.

18. The SoC of claim 17, wherein:

the plurality of enabled lanes correspond to a mainband of the D2D interconnect link; and the handshake comprises sideband messages.

19. The SoC of claim 17, further comprising:

means for training the D2D interconnect link; and means for updating a lane status register to indicate the functional lane based on the training of the D2D interconnect link.

20. The SoC of claim 19, further comprising:

means for remapping a connection between a logical lane corresponding to the faulty lane and the functional lane from the plurality of disabled lanes based on the lane status register.

21. The SoC of claim 20, further comprising:

means for signaling, between a first device and a second device, to indicate successful link formation in response to remapping the logical lane to the functional lane.

22. The SoC of claim 20, further comprising:

means for routing the connection between the logical lane and the functional lane using at least one of a multiplexer or a demultiplexer controlled based on the lane status register.

23. The SoC of claim 17, wherein the D2D interconnect link comprises non-contiguous physical lanes that are mapped to contiguous logical lanes.

24. An integrated circuit device comprising:

a first die;

a second die; and a die-to-die (D2D) interconnect link connected between the first die and the second die, the first die comprising:

a communication interface connected to the D2D interconnect link; and one or more processors connected to the communication interface, the one or more processors being configured to:

operate the D2D interconnect link as a degraded link comprising a plurality of enabled lanes and a plurality of disabled lanes;

detect a faulty lane among the plurality of enabled lanes;

replace the faulty lane using a functional lane from the plurality of disabled lanes to maintain the D2D interconnect link in a resilient link mode; and initiate a handshake with the second die to operate the D2D interconnect link in the resilient link mode during a mainband initialization state of the D2D interconnect link.

25. The integrated circuit device of claim 24, wherein:

the plurality of enabled lanes correspond to a mainband of the D2D interconnect link; and the handshake comprises sideband messages.

26. The integrated circuit device of claim 24, wherein the one or more processors are further configured to:

train the D2D interconnect link; and update a lane status register to indicate the functional lane based on the training of the D2D interconnect link.

27. The integrated circuit device of claim 26, wherein to replace the faulty lane, the one or more processors are further configured to:

remap a connection between a logical lane corresponding to the faulty lane and the functional lane from the plurality of disabled lanes based on the lane status register.

28. The integrated circuit device of claim 27, wherein the one or more processors are further configured to:

signal, the second die, to indicate successful link formation in response to remapping the logical lane to the functional lane.

29. The integrated circuit device of claim 27, wherein to remap the connection, the one or more processors are further configured to:

remap the connection between the logical lane and the functional lane using at least one of a multiplexer or demultiplexer controlled based on the lane status register.

30. The integrated circuit device of claim 24, wherein the D2D interconnect link comprises non-contiguous physical lanes that are mapped to contiguous logical lanes.

* * * * *